United States Patent
Kliner

(10) Patent No.: US 11,531,163 B2
(45) Date of Patent: Dec. 20, 2022

(54) HIGH-NUMERICAL APERTURE LIGHT STRIPPER

(71) Applicant: nLIGHT, INC., Vancouver, WA (US)

(72) Inventor: Dahv A. V. Kliner, Portland, OR (US)

(73) Assignee: NLIGHT, INC., Vancouver, WA (US)

( * ) Notice: Subject to any disclaimer, the term of this patent is extended or adjusted under 35 U.S.C. 154(b) by 0 days.

(21) Appl. No.: 16/294,803

(22) Filed: Mar. 6, 2019

(65) Prior Publication Data
US 2019/0204509 A1 Jul. 4, 2019

Related U.S. Application Data

(63) Continuation of application No. 15/595,748, filed on May 15, 2017, now Pat. No. 10,267,993.

(60) Provisional application No. 62/336,710, filed on May 15, 2016.

(51) Int. Cl.
*G02B 6/28* (2006.01)
*G02B 6/42* (2006.01)
*G02B 6/036* (2006.01)
*G02B 6/32* (2006.01)

(52) U.S. Cl.
CPC ........... *G02B 6/2852* (2013.01); *G02B 6/036* (2013.01); *G02B 6/03633* (2013.01); *G02B 6/32* (2013.01); *G02B 6/4207* (2013.01); *G02B 6/4287* (2013.01); *G02B 6/4296* (2013.01)

(58) Field of Classification Search
CPC ......... G02B 6/2852; G02B 6/32; G02B 6/036
See application file for complete search history.

(56) References Cited

U.S. PATENT DOCUMENTS

| | | | | |
|---|---|---|---|---|
| 4,475,935 A | * | 10/1984 | Tanaka | G02B 6/2558 65/31 |
| 5,018,824 A | * | 5/1991 | Ooe | G02B 6/2551 219/121.2 |
| 6,153,258 A | * | 11/2000 | Goldman | B05D 7/20 385/95 |
| 6,198,868 B1 | * | 3/2001 | Jang | G02B 6/02095 385/128 |
| 6,314,222 B1 | | 11/2001 | Jang | |
| 7,010,204 B2 | | 3/2006 | Reith | |
| 8,027,555 B1 | | 9/2011 | Kliner et al. | |

(Continued)

FOREIGN PATENT DOCUMENTS

| | | |
|---|---|---|
| CN | 105531534 | 4/2016 |
| WO | 2015017909 | 2/2015 |

(Continued)

OTHER PUBLICATIONS

USPTO; International Search Report and Written Opinion for PCT/US17/32765, dated Sep. 28, 2017, 11 pages.

(Continued)

*Primary Examiner* — Ellen E Kim

(57) ABSTRACT

A fiber connector, comprising a housing comprising a region extending in a lengthwise direction an optical fiber disposed in the region, a first portion of the optical fiber comprising an inner core, a cladding layer surrounding the core, and a first outer polymer layer surrounding the cladding layer and a second portion of the optical fiber comprising the inner core, the cladding layer surrounding the core and a second outer polymer layer that is different from the first polymer layer.

7 Claims, 7 Drawing Sheets

(56) References Cited

U.S. PATENT DOCUMENTS

| | | | |
|---|---|---|---|
| 9,158,080 B2* | 10/2015 | Logunov | G02B 6/04 |
| 9,547,121 B2 | 1/2017 | Hou et al. | |
| 9,634,462 B2 | 4/2017 | Kliner et al. | |
| 2003/0123837 A1 | 7/2003 | Yamamoto et al. | |
| 2008/0019650 A1* | 1/2008 | Hokansson | G02B 6/03644 |
| | | | 385/128 |
| 2008/0019657 A1* | 1/2008 | Maitland | G02B 6/0008 |
| | | | 385/140 |
| 2009/0080835 A1 | 3/2009 | Frith | |
| 2009/0092358 A1 | 4/2009 | Watanabe et al. | |
| 2009/0175301 A1 | 7/2009 | Cheng | |
| 2009/0180745 A1 | 7/2009 | Zerfas et al. | |
| 2009/0297102 A1 | 12/2009 | Kachmar | |
| 2009/0299352 A1* | 12/2009 | Zerfas et al. | A61B 1/00165 |
| | | | 606/15 |
| 2010/1243963 | 5/2010 | Cheng | |
| 2011/0135262 A1 | 6/2011 | Molin et al. | |
| 2011/0150398 A1 | 6/2011 | Zimmel et al. | |
| 2011/0182552 A1* | 7/2011 | Russert | G02B 6/40 |
| | | | 385/77 |
| 2012/0052213 A1* | 3/2012 | Terada | G02B 6/02395 |
| | | | 427/163.2 |
| 2013/0087694 A1 | 4/2013 | Creeden | |
| 2014/0348501 A1* | 11/2014 | Bao | H04B 10/0797 |
| | | | 398/29 |
| 2015/0055915 A1* | 2/2015 | Logunov | G02B 6/04 |
| | | | 385/31 |
| 2015/0062693 A1* | 3/2015 | Fishteyn | H01S 3/0407 |
| | | | 359/341.1 |
| 2017/0110845 A1 | 4/2017 | Hou et al. | |

FOREIGN PATENT DOCUMENTS

| | | |
|---|---|---|
| WO | 2015026998 | 2/2015 |
| WO | 2015086272 | 6/2015 |

OTHER PUBLICATIONS

European Patent Office, The Hague; EP Extended Search Report, EP 17799968; dated Nov. 11, 2019; 7 pages.

* cited by examiner

```
┌─────────────────────────────────────────────────┐
│  FABRICATE AN OPTICAL FIBER THAT INCLUDES A CORE,│
│  AN INNER CLADDING, AND AN OUTER COATING         │
│  COMPRISING A FIRST LOW INDEX OF REFRACTION      │
│  MATERIAL                                        │
│  202                                             │
└─────────────────────────────────────────────────┘
                        │
                        ▼
┌─────────────────────────────────────────────────┐
│  STRIP A SECTION OF THE FIRST LOW INDEX OF       │
│  REFRACTION MATERIAL FROM THE OPTICAL FIBER      │
│  204                                             │
└─────────────────────────────────────────────────┘
                        │
                        ▼
┌─────────────────────────────────────────────────┐
│  SELECT A SECOND LOW INDEX OF REFRACTION MATERIAL│
│  CONFIGURED TO REMOVE HIGH-NA LIGHT FROM LIGHT   │
│  PROPAGATING IN THE OPTICAL FIBER                │
│  206                                             │
└─────────────────────────────────────────────────┘
                        │
                        ▼
┌─────────────────────────────────────────────────┐
│  COAT THE SECTION WITH THE SECOND LOW INDEX OF   │
│  REFRACTION MATERIAL                             │
│  208                                             │
└─────────────────────────────────────────────────┘
```

HIGH-NUMERICAL APERTURE LIGHT STRIPPER

RELATED APPLICATIONS

This application is a continuation of and claims priority to U.S. patent application Ser. No. 15/595,748, filed May 15, 2017, which is a non-provisional of and claims priority to U.S. provisional patent application No. 62/336,710, filed May 15, 2016, all of which are incorporated herein in their entirety.

TECHNICAL FIELD

The technology disclosed herein relates to high-power fiber and fiber-coupled lasers. More particularly, the disclosed technology relates to managing back-reflected light in an optical fiber connector.

BACKGROUND

The use of high-power fiber-coupled lasers is increasing in popularity for a variety of applications such as materials processing, cutting, welding, and/or additive manufacturing. Fiber-coupled lasers include fiber lasers, disk lasers, diode lasers, diode-pumped solid state lasers, and lamp-pumped solid state lasers; fiber lasers are the most prevalent fiber-coupled laser source. In these systems, optical power is delivered from the laser to a work piece via an optical fiber, which typically includes a connector at the end. Intermediate fibers between the fiber-coupled laser and the work piece may also be employed, and these intermediate fibers also typically include connectors at both ends. These connectors are typically designed to precisely align the beam emerging from the fiber to maintain pointing of the output beam through the downstream optics and to facilitate multiple connection/disconnection cycles.

A common problem with coupling fibers is that significant optical power may be reflected back into the fiber from the work piece or from optics between the fiber and the work piece. The back-reflected light that is coupled into the fiber may be coupled into the core or cladding of the fiber, but typically most is coupled into the cladding. The back-reflected power coupled into the fiber core is typically transmitted back through the cable toward the laser, but the fiber connector should be configured to manage the power coupled into the fiber cladding. Existing connectors either strip this power or attempt to retain it in the cladding of the fiber. Stripping the back-reflected cladding light is limited by the capability of the connector to dissipate the resultant heat. Furthermore, this method increases the cost and complexity of the connector, typically requires water cooling, introduces failure modes, and limits the ability to monitor the back-reflected light. Monitoring back-reflected light can be useful for process monitoring, control, and optimization. Retaining the back-reflected power in the cladding can result in coupling of light into the cladding that is only weakly guided (i.e., is near the limit of the NA or acceptance angle of the fiber). Bending of the fiber can strip this light, causing localized heating and cable failure. Thus, there exists a need for a fiber connector that neither strips and dumps the back-reflected light in the cladding nor guides it unperturbed into the fiber.

SUMMARY

Disclosed herein is a fiber connector, comprising a housing having a region extending in a lengthwise direction, an optical fiber disposed in the region, a first portion of the optical fiber comprising an inner core, a cladding layer surrounding the inner core, and a first outer polymer layer surrounding the cladding layer and a second portion of the optical fiber comprising the inner core, the cladding layer surrounding the inner core and a second outer polymer layer that is different from the first outer polymer layer. In an example, the first portion and the second portion are adjacent to one another. The first outer polymer layer may have an index of refraction that is lower than the index of refraction of the second outer polymer layer. In an example, the second outer polymer layer has in index of refraction that is lower than the index of refraction of the cladding layer. In an example, the second polymer layer is a fluoroacrylate-based polymer, a silicone-based polymer, a fluorosilicate glass, or a borosilicate glass, or any combination thereof. In an example, the second polymer layer comprises a polymer material or glass material, wherein the polymer or glass material includes holes configured to influence light guiding properties. In an example, the second polymer layer comprises a structured or textured surface.

Further disclosed herein is a fiber connector, comprising a housing having a region extending in a lengthwise direction, a coreless optical fiber disposed in the region, a first portion of the coreless optical fiber coated with a first outer polymer layer and a second portion of the coreless optical fiber coated with a second outer polymer layer, wherein the second outer polymer layer is different from the first outer polymer layer. In an example, the first portion and the second portion are adjacent to one another and wherein the first polymer layer has an index of refraction that is lower than the index of refraction of the second polymer. In an example, the second polymer layer has in index of refraction that is lower than the index of refraction of the coreless optical fiber. In an example, the second polymer layer is a fluoroacrylate-based polymer, a silicone-based polymer, fluorosilicate glass, or a borosilicate glass, or any combination thereof. In an example, the second polymer layer comprises a polymer material or glass materials, wherein the polymer or glass materials includes holes configured to influence light guiding properties. In an example, the second polymer layer comprises a textured or structured surface.

A method is disclosed herein, comprising fabricating an optical fiber to include a core, an inner cladding, and an outer coating comprising a first low index of refraction material; stripping a section of the first low index of refraction material from the optical fiber, selecting a second low index of refraction material configured to remove high-NA light from light propagating in the optical fiber and coating the section with the second low index of refraction material. In an example, the second low index of refraction material is selected to provide a numerical aperture (NA) in the optical fiber sufficient to remove a substantial portion of high-NA light propagating in the optical fiber, wherein the high-NA light is the light propagating in the optical fiber that has the highest NA.

A method is disclosed herein for removing a high-NA portion of light propagating in an optical fiber, comprising coating a first portion of an optical fiber with a first low index of refraction material, coating a second portion of the optical fiber with a second low index of refraction material, wherein the second low index of refraction material is different from the first low index of refraction material and is selected to prevent a high-NA portion of light from continuing to propagate in optical fiber, transmitting light in the optical fiber and removing the high-NA portion of the transmitted light in the second portion of the optical fiber to produce remaining light with the high-NA portion of light removed. The method may further include receiving back-reflected light in the optical fiber, the back-reflected light comprising the transmitted light reflected back into the optical fiber, wherein the second portion removes a high-NA portion of the back-reflected light leaving remaining back-reflected light, guiding the remaining back-reflected light to a laser system monitoring module or laser system control module, or a combination thereof, monitoring the back-reflected light to generate, store or analyze, or any combinations thereof data related to system performance and processing performance, and removing the remaining back-reflected light in the control module.

BRIEF DESCRIPTION OF THE DRAWINGS

The accompanying drawings, wherein like reference numerals represent like elements, are incorporated in and constitute a part of this specification and, together with the description, explain the advantages and principles of the presently disclosed technology. In the drawings.

FIG. 2 illustrates an example process for fabricating an optical fiber comprising a high-NA light stripper configured to remove a portion of back-reflected light.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus are referred to as "lowest", "best", "minimum," or the like. It will be appreciated that such descriptions are intended to indicate that a selection among many used functional alternatives can be made, and such selections need not be better, smaller, or otherwise preferable to other selections. Examples are described with reference to directions indicated as "above," "below," "upper," "lower," and the like. These terms are used for convenient description, but do not imply any particular spatial orientation.

Figure 1A:
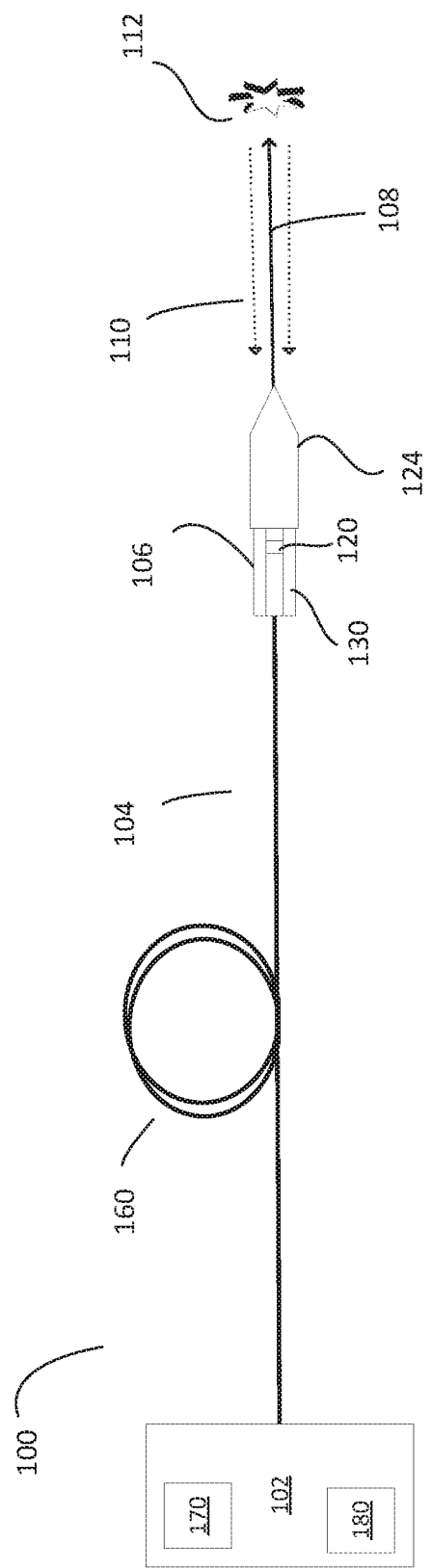
FIG. 1A illustrates an example high-power fiber laser system for removing a portion of back-reflected light.

FIG. 1A illustrates an example high-power fiber laser system 100 for removing a portion of back-reflected light In an example, laser module 102 is configured to generate optical power. Laser module 102 couples the optical power into optical fiber 104. Optical fiber 104 transmits optical power to processing head 124 which is configured to direct beam 108 onto a material for processing such as workpiece 112. Processing head 124 may be operable to execute a variety of material processing actions such as welding, cutting, brazing, ablating, additive manufacturing, or the like or any combinations thereof. When beam 108 is emitted from processing head 124 some of the optical power or light is reflected back toward processing head 124. This back-reflected light 110 can enter processing head 124. Some of the back-reflected light 110 may couple into the core or cladding of fiber 104.

Back-reflected light 110 may enter fiber 104 at a variety of angles. The numerical aperture (NA) of an optical system characterizes the range of angles over which the system can accept or emit light. Taking the arc sine of the NA of fiber 104 gives the critical angle (from the longitudinal axis of fiber 104). Back-reflected light 110 that enters fiber 104 well within the critical angle of the core will be well-guided in the fiber core and may travel back to laser module 102. However, back-reflected light 110 incident to an interface of fiber 104 at an angle beyond the critical angle will not be guided in the fiber core and will pass into the cladding. Similarly, back-reflected light may be launched directly into the fiber cladding if it does not spatially overlap with the core. Thus, the portion of back-reflected light 110 that launches into the fiber cladding depends upon the spatial and angular distributions of the back-reflected light 110.

For clarity, examples describe back-reflected light 110 from the workpiece 112 as the source of cladding light. However, there are a variety potential sources of cladding light that is purposely or inadvertently launched into fiber 104 whether back-reflected or transmitted in a forward direction and claimed subject matter is not limited in this regard. For example, cladding light may originate with misaligned fiber splices, irregularities in the fiber, and/or back-reflections or scattering from optical components or other surfaces.

The light propagating in the fiber cladding typically includes a range of angles. It may be desirable to limit the maximum angle of light propagating in the cladding, and light above the desired maximum angle is referred to herein as "high-NA light." The desired maximum angle depends on the fiber laser system 100 application. For example, it may be desirable to eliminate high-NA light because it may be relatively poorly guided in the cladding. This poorly guided cladding light may leak out of the cladding of fiber 104 at various locations such as in connector 106, at fiber bend 160 and/or where there are irregularities in the fiber or fiber coating. As poorly guided (high-NA) light escapes from fiber 104 it can cause thermal damage and failures in the fiber 104 at the points where it escapes. Process head 124 and/or connector 106 may have heat sinking devices to dissipate heat generated by escaping poorly guided light.

In an example, a high-NA light stripper 120 disposed in housing 130 of connector 106 is configured to strip the high-NA fraction of light out of back-reflected light 110 before it is passed into the core and/or cladding of fiber 104 thus preserving the portion of back-reflected light 110 that can be guided in the core and/or cladding. Stripping out the high-NA portion of back-reflected light simultaneously minimizes the shortcomings of conventional connector design: 1) the probability of fiber failure from loss of high-NA light is greatly reduced because the high-NA light is stripped in the connector, and 2) the required power-handling capability of connector 106 is greatly reduced, possibly even eliminating the need for water cooling, because a significant fraction of the back-reflected light remains in the cladding and is thus not dumped in the connector 106. Removal of the high-NA light from the back-reflected light 110 permits the remaining back-reflected light 110 to be guided safely all the way back to laser module 102 where the back-reflected light 110 may disposed of (converted to heat) in a controlled manner and/or monitored to track performance of the laser system 100 and/or for process monitoring and control.

Monitoring of back-reflected light 110 can provide critical data on laser system 100 function and/or workpiece processing. Such monitoring may be accomplished in a variety of ways, for example, after stripping of the high-NA portion of back-reflected light 110, the light that is guided back to laser module 102 may be detected by sensor 170 and monitored and/or analyzed by monitor 180. Sensor 170 may comprise any of a variety of sensors including one or more photodiodes, thermal sensors, IR sensors, chemical sensors, charge sensors, pressure sensors, or the like or any combinations thereof. Sensor data can be used to monitor, control, and optimize performance of the material processing system.

Figure 1B:
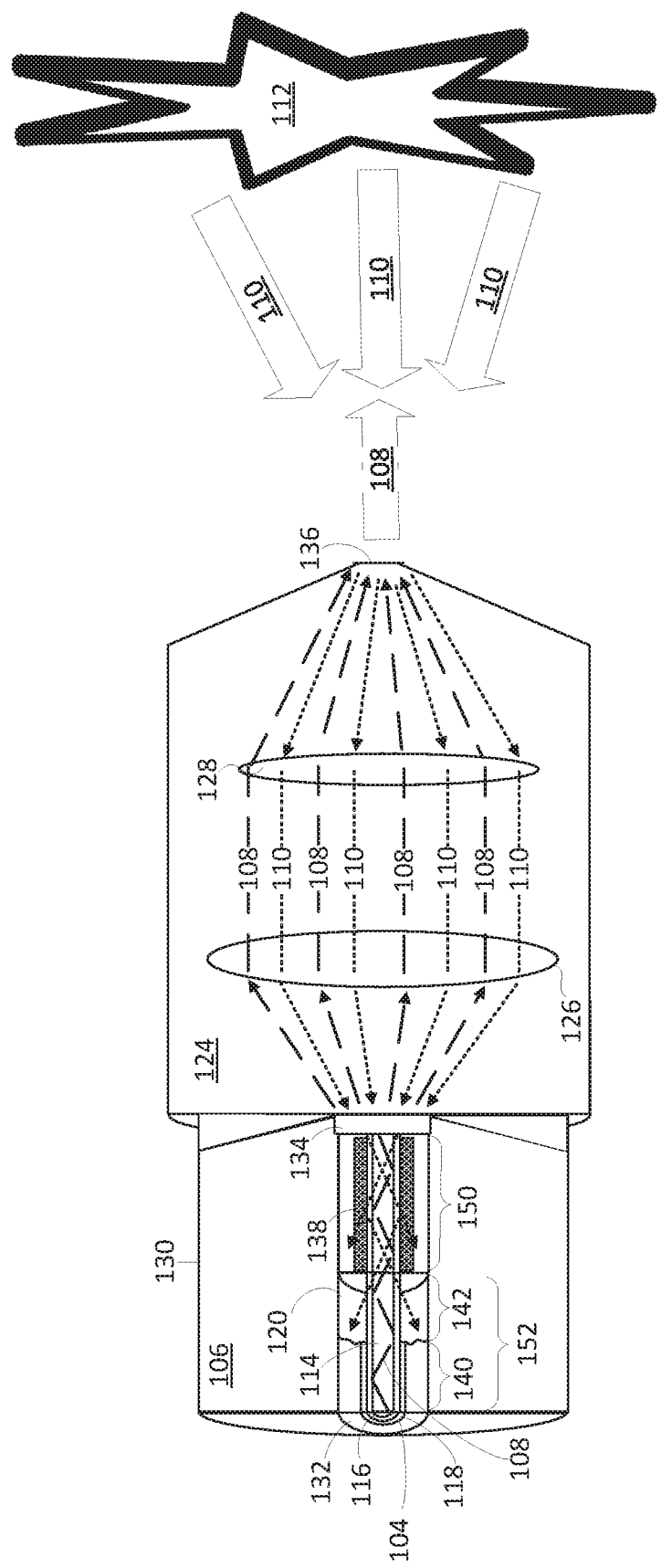
FIG. 1B illustrates an example connector comprising a high-NA light stripper configured to remove a portion of back-reflected light.

FIG. 1B illustrates an example block diagram depicting a connector 106 incorporating high-NA stripper 120. In an example, connector 106 may be coupled to processing head 124. Connector 106 includes housing 130 having a region 132 extending in the lengthwise direction of connector 106 with fiber 104 extending therethrough. Region 132 may comprise a chamber which may be centered or offset and may have a first section 150 for isolating thermal dissipation and a second section 152 for removing high-NA light. In an example, first section 152 may comprise a portion 140 wherein cladding 116 of fiber 104 is coated with polymer 118 and portion 142 wherein cladding 116 of fiber 104 has a high-NA light stripper 120 coating rather than a coating of polymer 118. Polymer 118 is only one example of a coating that may be disposed in portion 140. Materials other than a polymer may be used as a coating in portion 140 and claimed subject matter is not limited in this regard.

High-NA light stripper 120 may have an index of refraction that is different than the index of refraction of polymer layer 118 to enable stripping of high-NA light. In an example, high-NA light stripper 120 has a higher index of refraction than polymer layer 118 and lower index of refraction than cladding layer 116. High-NA light stripper 120 may comprise a variety of materials or textures capable of stripping the high-NA fraction of light from back-reflected light 110. Such materials may comprise polymers (e.g., fluoroacylate- or silicone-based polymers), glasses (e.g., fluorosilicate or borosilicate glasses), or polymer or glass materials including holes to influence the guiding properties (the holes may be filled with air or with other substances). Certain textures or surface treatments may enable or improve the ability of high-NA light stripper 120 to remove a targeted fraction of high-NA light as well. Such textures or treatments may include a roughened, structured surface of a high-NA light stripper 120.

The region of fiber 104 covered with high-NA stripper 120 may be any of a variety of lengths. Typical lengths may be between 5.0 mm and 100.0 mm. High-NA light stripper 120 may be extruded into region 132 around core 114 and cladding 116 of portion 142. High-NA light stripper 120 may fill a cavity of region 132 and cure to a semi-solid state such that high-NA light stripper 120 will substantially maintain its shape within region 132. High-NA light stripper 120 may be in contact with and/or encase a section of portion 140 such that polymer 118 is flush with or enveloped at an end adjacent to high-NA light stripper 120 by high-NA light stripper 120. In an example, high-NA light stripper may be curved to influence the NA-dependent stripping efficiency.

Connector 106 is configured to be coupled to and uncoupled from processing head 124. In some examples, connector 106 may be permanently coupled to or may form a part of processing head 124. Fiber 104 is disposed within a region 132 extending longitudinally through connector 106. Beam 108 is guided along core 114 and emitted from fiber 104 through an aperture comprising an endcap 134 into processing head 124.

In an example, processing head 124 may include a variety of optics for focusing beam 108 onto workpiece 112. For example, such optics may include a collimating lens 126 and a focusing lens 128. As beam 108 exits aperture 136 of processing head 124 and strikes workpiece 112, back-reflected light 110 reflects from a surface of workpiece 112 and enters processing head 124 at aperture 136. Focusing lens 128 and collimating lens 126 focus back-reflected light 110 into fiber 104 through endcap 134.

In an example, back-reflected light 110 enters fiber 104 in section 150. A heat sink 138 may be disposed in section 150 and thermally coupled to the fiber 104. Heat sink 138 may comprise any of a variety of heat absorbing or heat dissipating structures such as liquid-cooled channels, highly thermally conductive materials, or the like or any combinations thereof. Heat sink 138 may absorb/dissipate heat generated by loss of back-reflected light 110 from fiber 104. The stripped portion of high-NA back-reflected light 110 may be absorbed by heat sink 138. Heat sink 138 may convert the stripped high-NA light to heat (e.g., by absorption of the light), spread the heat, and/or transmit the heat to a cooled surface (e.g., a water-cooled cold plate).

In a light stripping portion 142 of connector 106, high-NA light stripper 120 may remove high-NA light portion 122 of back-reflected light 110. Back-reflected light 110 with the high-NA light portion 122 removed may be launched into core 114 and/or cladding 116.

Figure 1C:
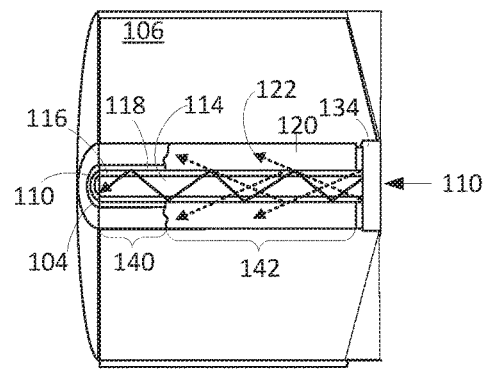
FIG. 1C illustrates an example connector comprising a high-NA light stripper configured to remove a portion of back-reflected light.

FIG. 1C illustrates connector 106 comprising high-NA light stripper 120. As noted previously, transmitting much of the cladding light to the fiber 104 (i.e., not stripping all of the cladding light in the connector) may reduce or eliminate the need for water-cooling or other heat sinking methods in region 132 (see FIG. 1B). Accordingly, FIG. 1C depicts a connector 106 without a water-cooled heat sink or a separate section 150 for isolating thermal dissipation. In an example, back-reflected light 110 enters fiber 104 through endcap 134. High-NA light 122 is stripped out in portion 142 by high-NA light stripper 120. In portion 140, back-reflected light 110 with the high-NA portion 122 removed is guided by polymer layer 118 back to laser pump module 102 in cladding layer 116. Although not depicted in FIG. C, some back-reflected light 110 may be guided in core 114 as well.

Figure 1D:
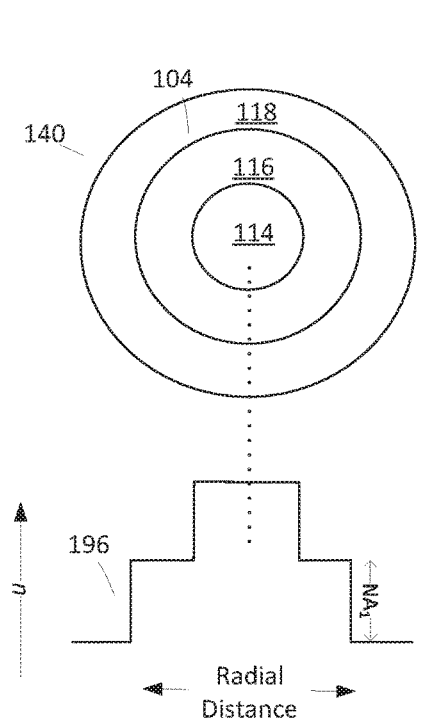
FIG. 1D depicts a cross-sectional view of an example of a first portion of an optical fiber configured to remove a portion of back-reflected light.

FIG. 1D depicts a cross-sectional view of an example of a portion 140 of optical fiber 104. Portion 140 comprises a core 114, layer of cladding 116, and a low index of refraction polymer layer 118. Refractive index profile 196 of portion 140 shows the relative values of refractive indices of core 114, cladding 116, and polymer layer 118. The NA of the cladding 116, denoted NA1, is determined by the refractive index difference between the cladding 116 and the polymer layer 118.

Figure 1E:
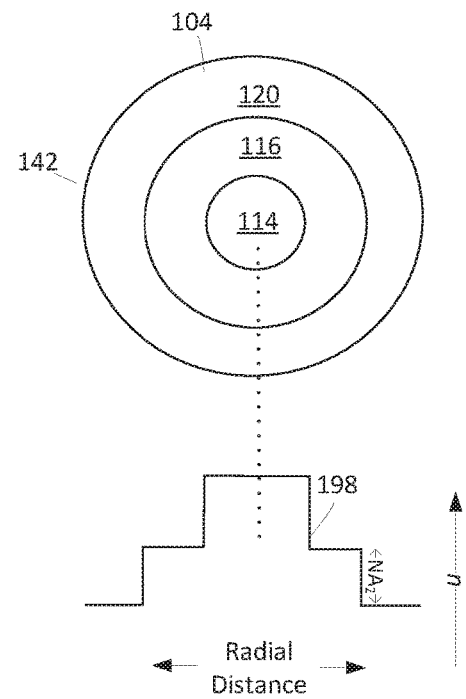
FIG. 1E depicts a cross-sectional view of an example of a second portion of an optical fiber configured to remove a portion of back-reflected light.

FIG. 1E depicts a cross-sectional view of an example of portion 142 of an optical fiber 104 comprising high-NA light stripper 120. Portion 142 may be adjacent to portion 140. Polymer layer 118 may be removed from fiber 104 exposing cladding 116 in portion 142. Polymer layer 118 may be replaced with high-NA light stripper 120. High-NA light stripper 120 may be disposed within region 132 around fiber 104 cladding 116 and core 114 in portion 142. Alternatively, fiber 104 may be manufactured with a high-NA light stripper 120 coating around cladding 116 in portion 142. In another embodiment, high-NA light stripper 120 may replace polymer layer 118 in more than one portion of optical fiber 104.

Refractive index profile 198 of portion 142 shows the relative values of the refractive indices of core 114, cladding 116, and high-NA light stripper 120. The NA of the cladding 116, denoted NA2, is determined by the refractive index difference between the cladding 116 and the material comprising the high-NA light stripper 120. Comparing $NA_1$ in FIG. 1D and NA2, NA2 is clearly smaller. The reduced NA restricts the acceptance angle of light that is guided in the cladding in portion 142, stripping out the high-NA tail of forward- or backward-propagating light that passes through the high-NA light stripper 120.

Figure 1F:
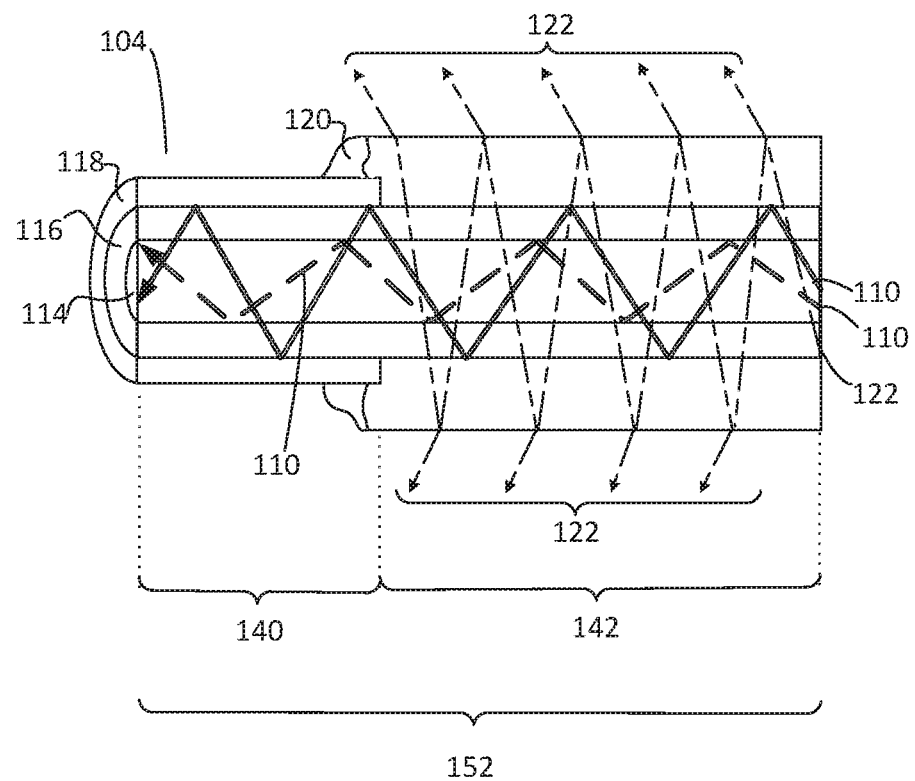
FIG. 1F illustrates an example of fiber having a core and cladding comprising high-NA light stripper.

FIG. 1F illustrates an example of fiber 104 comprising high-NA light stripper 120. When back-reflected light 110 enters portion 142 of fiber 104 it may include a high-NA tail that is not well guided In an example, the high-NA light portion 122 of back-reflected light 110 is represented with a single dashed line. The portion of back-reflected light 110 that is guided in the core 114 and cladding 116 is represented with compound dashed and solid lines, respectively. In an example, polymer coating 118 in portion 140 may provide an NA of about 0.30-0.48. Polymer layer 118 may be stripped away from fiber 104 in portion 142. Portion 142 may be recoated with another polymer to provide high-NA light stripper 120 having a lower NA than coating 118. For example, high-NA light stripper 120 may have an NA of about 0.20 where layer 118 has a NA of 0.30. In another example, high-NA light stripper 120 may have an NA of about 0.30 when low index polymer coating 118 has a NA of 0.48. The example NAs given hereinabove are for illustrative purposes only and claimed subject matter is not limited in this regard. Use of materials providing other NA values is contemplated within the scope of this disclosure.

As high-NA light portion 122 is transmitted through high-NA light stripper 120 some of high-NA light portion 122 is removed. The NA of the fiber (i.e., the range of angles that are guided within the fiber) is determined by the refractive indices of the fiber (typically silica) and the cladding (typically a polymer, but sometimes a low-index glass). The fiber cladding can be selected to have a refractive index that provides the desired NA. Light launched into the fiber with an NA above that of the fiber will not be guided; it will be stripped out of the fiber and will propagate in or through the cladding 116. The light remaining in the fiber will thus have the high-NA tail removed from back-reflected light 110 by high-NA light stripper 120. High-NA light portion 122 represents a fraction of back-reflected light 110, removal of which does not transfer significant optical power into surrounding structures such as housing 130.

Remaining back-reflected light 110 continues to transmit beyond high-NA light stripper 120 and is launched into core 114 and/or cladding 116 without escaping into the low index polymer coating 118. In this way, a substantial portion of the high-NA light that is not easily guided in the core 114 and/or cladding 116 of fiber 104 is removed. The remaining portion of back-reflected light 110 can be more easily guided by core 114 and/or cladding 116 back to a laser module 102 where back-reflected light 110 can be monitored and more easily stripped and dumped (converted to heat).

High-NA light stripper 120 will also strip the high-NA tail of forward-propagating light in fiber 104. This property may be desirable to limit the range of angles of light exiting fiber 104.

Figure 1G:
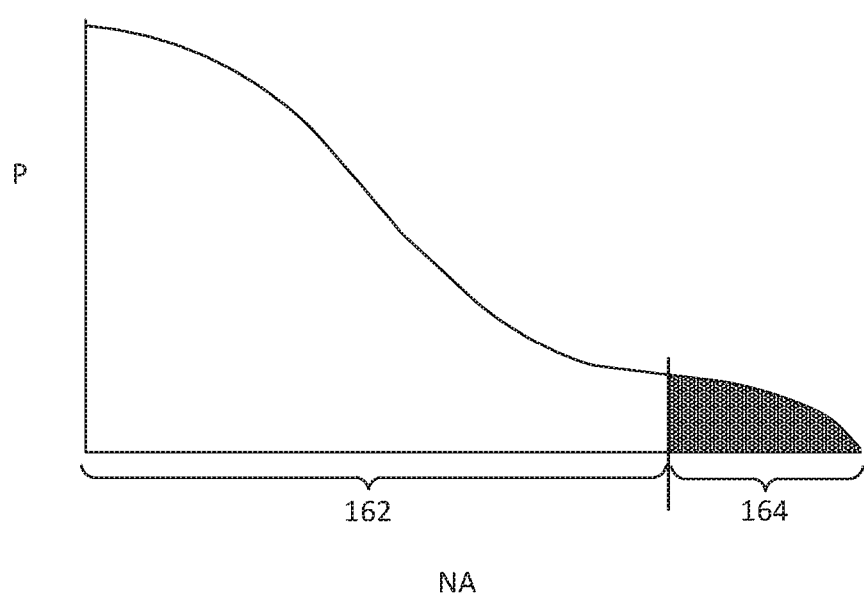
FIG. 1G is a graph illustrating the relative amount of optical power that can be launched into a fiber having a given NA.

FIG. 1G shows an example of the NA distribution of back-reflected light 110 that may be coupled into fiber 104. Section 162 represents the portion of back-reflected light 110 that is well-guided in the cladding 116. Section 164 represents the high-NA portion 122 of back-reflected light 110 that is stripped out by high-NA light stripper 120.

Figure 1H:
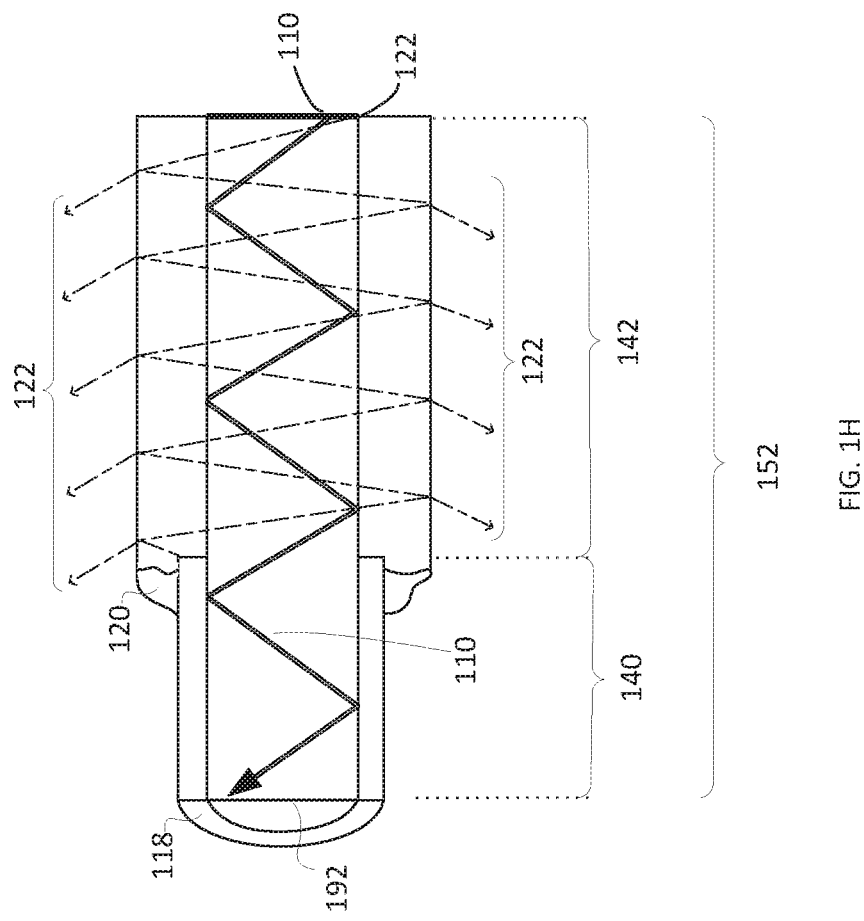
FIG. 1H illustrates an example of a coreless fiber including high-NA light stripper.

Although the examples above all describe a fiber having a core and cladding, the above described method and apparatus is compatible with coreless fiber as well. FIG. 1H illustrates an example of a coreless fiber 192 including high-NA light stripper 120. In an example, back-reflected light 110 enters coreless fiber 192. In an example, the high-NA light portion 122 of back-reflected light 110 is represented with a single dashed line. The portion of back-reflected light 110 that is guided by coreless fiber 192 is represented with a compound line. In an example, polymer coating 118 in portion 140 may provide an NA that is higher than high-NA light stripper 120. As high-NA light portion 122 is transmitted through high-NA light stripper 120 some of high-NA light portion 122 is removed. Remaining back-reflected light 110 continues to transmit beyond high-NA light stripper 120 in coreless fiber 192. In this way, a substantial portion of the high-NA light that is not easily guided in coreless fiber 192 is removed. The remaining portion of back-reflected light 110 can be more easily guided by coreless fiber 192 back to a laser module where back-reflected light can be monitored and more easily stripped.

FIG. 2 illustrates an example process 200 for fabricating an optical fiber comprising a high-NA light stripper 120 configured to remove a high-NA tail of light propagating in fiber 104. In an example, the high-NA tail of light is light that has the highest NA of the light that is guided in fiber 104, wherein the highest NA light may not be well-guided. Process 200 begins at block 202, where an optical fiber 104 is fabricated and includes a core 114, an inner cladding 116, and a polymer layer 118. The polymer layer 118 may comprise a first low index of refraction material. In another example, a coreless fiber 192 which is coreless may be fabricated without separate core and cladding layers (see FIG. 1H). Process 200 moves to block 204, where a section of the first low index of refraction material coating is stripped from the optical fiber 104. In some examples, the polymer layer 118 may not require stripping. Rather, fiber 104 may be manufactured without the polymer layer 118 in a particular section in anticipation of application of a different coating. Process 200 moves to block 206, where a second low index of refraction material configured to remove high-NA light from light propagating in the optical fiber is selected. Process 200 continues to block 208, where the section having polymer layer 118 removed is coated with the second low index of refraction material. In an example, the second low index of refraction coating is selected to provide a numerical aperture (NA) in the optical fiber sufficient to remove a substantial portion of high-NA light propagating in the optical fiber, wherein the high-NA light is the light propagating in the optical fiber that has the highest NA. In an example, the second low index of refraction material has an index of refraction that is higher than the first low index of refraction material.

Figure 3:
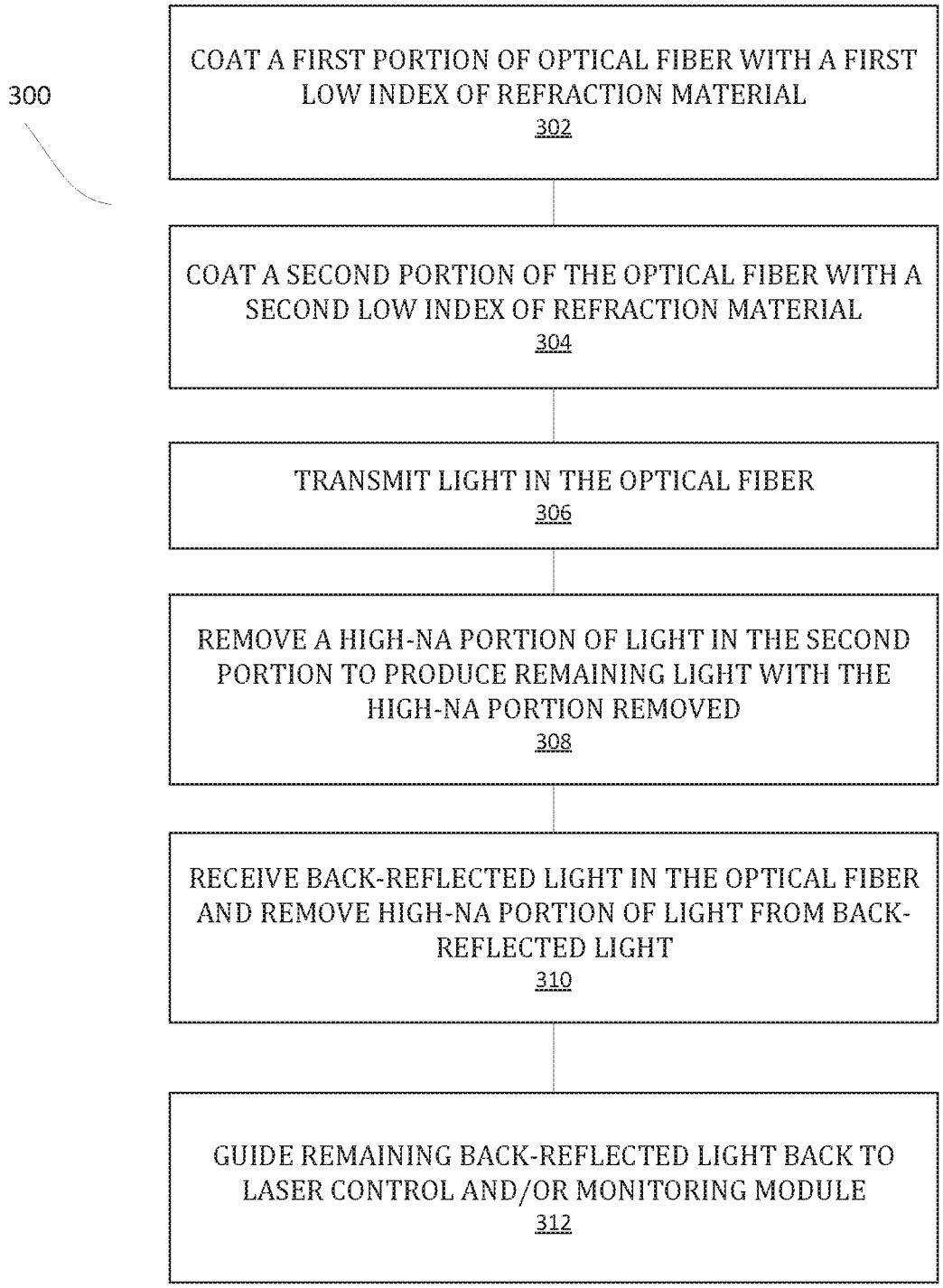
FIG. 3 illustrates an example process for removing a high-NA portion of back-reflected light.

FIG. 3 illustrates an example process 300 for removing a high-NA portion of light propagating in an optical fiber. Process 300 begins at block 302, where a portion 140 of an coreless fiber 192 or fiber 104 is coated with a first low index of refraction material. First index of refraction material may be any of a variety of materials including a polymer and/or a glass material or a combination thereof. Process 300 moves to block 304, where a portion 142 of the coreless fiber 192 or fiber 104 is coated with a second low index of refraction material, wherein the second low index of refraction material is selected to prevent a high-NA portion of light from propagating in optical fiber. The second index of refraction material may be any of a variety of materials including a polymer and/or a glass material or a combination thereof. In an example, second index of refraction material may comprise fluoroacrylate-based polymer, a silicone-based polymer, a fluorosilicate glass, or a borosilicate glass, or any combination thereof. Process 300 moves to block 306, where light is transmitted in the optical fiber and may be emitted from an end of the optical fiber. Process 300 moves to block 308, where a high-NA portion of light transmitting in optical fiber 104 or coreless fiber 192 is removed in portion 142 to produce remaining light having the high-NA portion removed.

In an example, process 300 may continue to block 310 where light emitted from the optical fiber 104 or coreless fiber 192 may be back-reflected and received back into the optical fiber 104 or coreless fiber 192, wherein the second portion removes a high-NA portion of the back-reflected light. At block 312, the back-reflected light with the high-NA portion removed may be guided back through the optical fiber to a monitoring and/or control module in the laser system where the back-reflected light can be monitored via one or more sensors to generate, store and/or or analyze data related to system performance and processing performance. Back-reflected light may be removed in the control module.

Although processes 200 and 300 have been described as having several steps, it is not necessary for all of the steps of these processes to be performed nor is there a particular order in which the steps are to be practiced within the scope of the contemplated subject matter. Although processes 200 and 300 above are described in the context of transmitting optical power in a high-power laser system 100, such description is for the sake of simplicity and is not intended to be limiting in any manner. Processes 200 and 300 may be applied in any laser system described or contemplated herein, for example a high or low-power laser system. Furthermore, unidentified intervening steps may be contemplated and practiced within the scope of the presently disclosed technology.

Having described and illustrated the general and specific principles of examples of the presently disclosed technology, it should be apparent that the examples may be modified in arrangement and detail without departing from such principles. We claim all modifications and variation coming within the spirit and scope of the following claims.

The invention claimed is:

1. A method, comprising:
fabricating an optical fiber to include a core, an inner cladding comprising a first material having a first index of refraction, and an outer coating comprising a second material having a second index of refraction;
stripping the second material from the optical fiber in a first section; and
coating the first section with a third material comprising a polymer or glass or a combination thereof having a third index of refraction, wherein the first section is disposed adjacent to a second section of the optical fiber retaining the second material, wherein the first material has a first numerical aperture (NA) in the first section and a second NA in the second section and wherein the first NA is smaller than the second NA, and wherein the third material comprises a roughened surface.

2. The method of claim 1, wherein the third material comprises texture or surface treatment or a combination thereof.

3. A method for removing a high-numerical aperture (NA) portion of light propagating in an optical fiber, comprising:
coating a first portion of an optical fiber comprising a core and cladding with a first material; and
coating a second portion of the optical fiber with a second material comprising a polymer or glass or a combination thereof wherein the cladding in the second portion has a smaller NA than the cladding in the first portion, and wherein the second material comprises a roughened surface.

4. The method of claim 3, further comprising receiving back-reflected light in the optical fiber, the back-reflected light comprising the transmitted light reflected back into the optical fiber, wherein the second portion removes a high-NA portion of the back-reflected light leaving remaining back-reflected light in the cladding to propagate in the second portion.

5. The method of claim 4, further comprising guiding the remaining back-reflected light to a laser system monitoring module or laser system control module, or a combination thereof.

6. The method of claim 5, further comprising monitoring the back-reflected light to generate, store or analyze, or any combinations thereof data related to system performance and processing performance.

7. The method of claim 5, further comprising removing the remaining back-reflected light in the control module.

\* \* \* \* \*